(12) United States Patent
Huang et al.

(10) Patent No.: US 8,279,539 B2
(45) Date of Patent: Oct. 2, 2012

(54) TRANSFER LENS AND WIDE-ANGLE LENS SYSTEM USING SAME

(75) Inventors: Hai-Jo Huang, Taipei Hsien (TW); Fang-Ying Peng, Taipei Hsien (TW); Sheng-An Wang, Taipei Hsien (TW); Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 139 days.

(21) Appl. No.: 12/965,833

(22) Filed: Dec. 11, 2010

(65) Prior Publication Data

US 2012/0105979 A1 May 3, 2012

(30) Foreign Application Priority Data

Oct. 27, 2010 (CN) .......................... 2010 1 0521605

(51) Int. Cl.
*G02B 9/04* (2006.01)
*G02B 3/02* (2006.01)

(52) U.S. Cl. ........................................ 359/793; 359/717
(58) Field of Classification Search .................. 359/717, 359/753, 793
See application file for complete search history.

(56) References Cited

U.S. PATENT DOCUMENTS 8,144,405 B2 * 3/2012 Asami .......................... 359/753
* cited by examiner

*Primary Examiner* — William Choi
(74) *Attorney, Agent, or Firm* — Altis Law Group, Inc.

(57) ABSTRACT

A lens system includes a main lens and a transfer lens aligned with the main lens. The optical axis of the main lens is superposed on that of the transfer lens. The transfer lens includes, in order from the object side to the image side thereof, a first lens having negative refraction power, and a second lens having positive refraction power. The lens system satisfies the following conditions: $0.4<|f_1/f_2|<0.8$; $2<v_1/v_2<3.8$; $0.86<N_1/N_2<1.12$; wherein, $f_1$ is a focal length of the first lens, $f_2$ is a focal length of the second lens, $v_1$ is an Abbe constant of the first lens, $v_2$ is an Abbe constant of the second lens, $N_1$ is a refractive index of the first lens, $N_2$ is a refractive index of the second lens.

7 Claims, 7 Drawing Sheets

TRANSFER LENS AND WIDE-ANGLE LENS SYSTEM USING SAME

BACKGROUND

1. Technical Fields

The present disclosure relates to lens systems and, more particularly, to a transfer lens and a wide-angle lens system using the same.

2. Description of Related Art

With the development of microcircuitry and multimedia technology, digital cameras are now in widespread use. Many mobile phones and PDAs (Personal Digital Assistants) are now equipped with a minimized digital camera. Conventionally, a viewing angle of a digital camera is between 50 degrees and 60 degrees. Digital cameras with such a range of viewing angle have a small imaging area, thereby it cannot satisfy some special purpose such as shooting a large area when, for example, users self-portraits.

What is needed, therefore, is a transfer lens and a wide-angle lens system using the transfer lens to obtain wider viewing angle to overcome or at least alleviate the above problems.

BRIEF DESCRIPTION OF THE DRAWING

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail below, with reference to the accompanying drawings.

Figure 1:
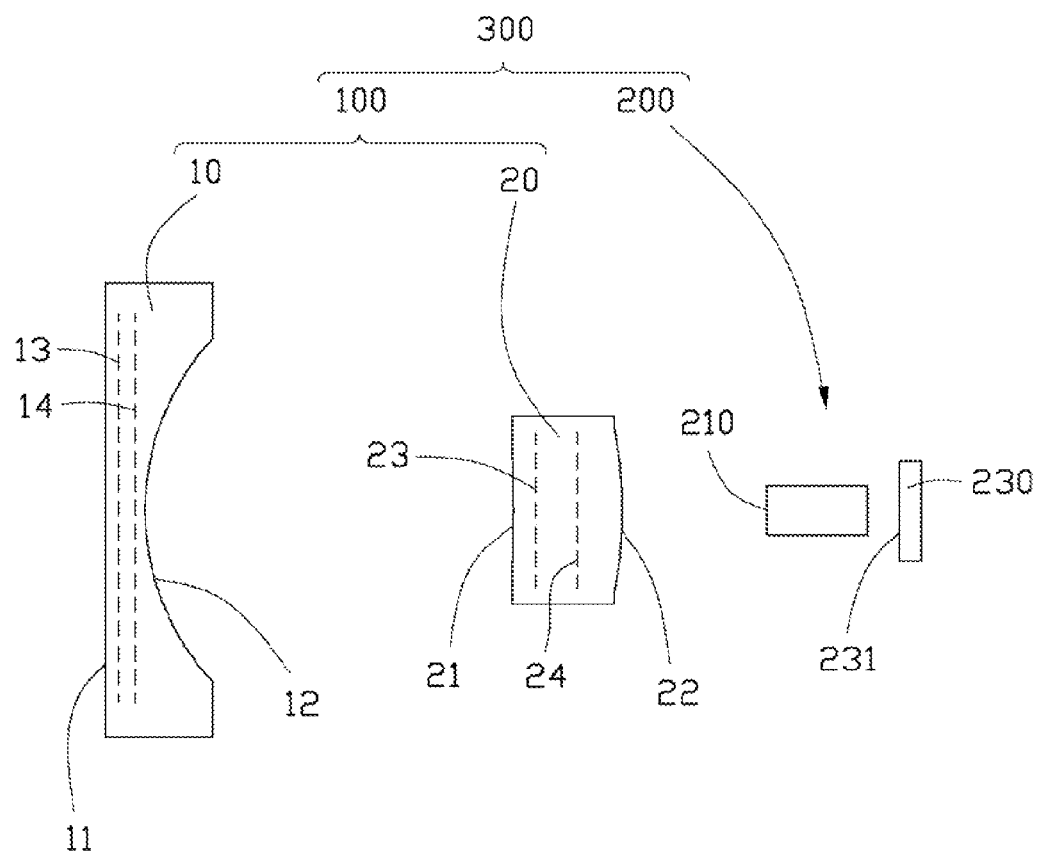
FIG. 1 is a schematic view of a wide-angle lens system of the present disclosure.

Referring to FIG. 1, a wide-angle lens system 300 includes a main lens 200 and a transfer lens 100 with wide viewing angle coupled to the main lens 200 detachably. The optical axis of the main lens 200 is superposed on that of the transfer lens 100. The wide-angle lens system 300 can be used in digital cameras, mobile phones, or personal computer cameras. In this embodiment, the wide-angle lens system 300 is used in mobile phones.

The main lens 200 includes an entrance pupil plane 210 to let in lights and an image sensor 230 having an imaging plane 231. When capturing an image, incident light enters the transfer lens 100 and the main lens 200 in sequence, through the entrance pupil plane 210, and focused onto the image plane 231 to form an image.

The transfer lens 100 includes, in order from an object side to an image side, a first lens 10 having negative refraction power, and a second lens 20 having positive refraction power. The first lens 10 includes a first object-side surface 11 facing the object side and a first image-side surface 12 facing the image side. The first object-side surface 11 is shaped as a plane while the first image-side surface 12 shaped as a concave surface. The second lens 20 includes a second object-side surface 21 and a second image-side surface 22 opposite to the second object-side surface 21. In the present embodiment, the second image-side surface 22 and the second object-side surface 21 are aspheric surfaces. The first lens 10 includes a first front principal point surface 13 and a first rear principal point surface 14. The second lens 20 includes a second front principal point surface 23 and a second rear principal point surface 24. The front principal point surface is a surface that when the first lens 10 or the second lens 20 is treated as a surface which ideally has no thickness (i.e., the surface is treated as being very thin) and can refract the light emitted from the object side of the transfer lens 100. The rear principal point surface is a surface that when the first lens 10 or the second lens 20 is treated as a surface which ideally has no thickness (i.e., the surface is treated as being very thin) and can refract the light emitted from the object side of the transfer lens 100.

In order to have a short overall length and a wider field angle, the wide-angle lens system 300 satisfies the following conditions:

$$0.4<|f1/f2|<0.8; \qquad (1)$$

wherein, f1 is a focal length of the first lens 10, f2 is a focal length of the second lens 20. The condition (1) limits the overall length of the wide-angle lens system 300 by providing the relationship between the focal length of the first lens 10 and the focal length of the second lens 20. If the focal length f1 of the first lens 10 is too long, the distance between the first lens 10 and the second lens 20 should be increased, thereby the thickness of the transfer lens 100 is also increased. However, if the focal length f1 of the first lens 10 is too short, the Coma aberration and the lateral chromatic aberration of the transfer lens 100 cannot be revised efficiently. As such, condition (1) can balance the thickness of the transfer lens 100 and the quality of the image.

In one embodiment, the wide-angle lens system 300 further satisfies the following condition:

$$2<v1/v2<3.8; \qquad (2)$$

wherein, v1 is an Abbe constant of the first lens 10, v2 is an Abbe constant of the second lens 20. Condition (2) is for correcting the longitudinal spherical aberration and the lateral chromatic aberration of the wide-angle lens system 300. If the Abbe constant v1 of the first lens 10 is too large, the astigmatism of the wide-angle lens system 300 cannot be revised. If the Abbe constant v1 of the first lens 10 is too small, the lateral chromatic aberration of the wide-angle lens system 300 may be out of the acceptable range.

In one embodiment, the wide-angle lens system 300 further satisfies the following condition:

$$0.86 < N1/N2 < 1.12; \quad (3)$$

wherein, N1 is a refractive index of the first lens 10, N2 is a refractive index of the second lens 20. Condition (3) can limit the field curvature of the wide-angle lens system 300 to be in an acceptable range.

In one embodiment, the wide-angle lens system 300 further satisfies the following condition:

$$3.1 < D2/D1 < 3.5; \quad (4)$$

wherein, D1 is a distance between the first front principal point surface 13 of the first lens 10 and the second front principal point surface 23 of the second lens 20, D2 is a distance between the second rear front principal point surface 24 of the second lens 20 and the entrance pupil plane 210 of the main lens 200. Condition (4) decides the height range of a light beam emitted into the transfer lens 100 and can revise the astigmatism and Coma aberration efficiently.

Furthermore, the first lens 10 and the second lens 20 can be made from a material manufactured relatively easy and inexpensive, such as resin or a plastic. In the present embodiment, the second lens 20 is made of plastic.

In one embodiment, at least one surface of the second lens 20 is aspheric. The shape of the aspheric surface is determined by expression 1 below. Expression 1 is based on a Cartesian coordinate system, with the vertex of the surface being the origin, and the optical axis extending from the vertex being the x-axis.

$$x = \frac{ch^2}{1 + \sqrt{1 - (k+1)c^2h^2}} + \sum A_i h^i; \quad \text{Expression 1}$$

wherein, h is a height from the optical axis to the aspheric surface, c is a vertex curvature, k is a conic constant, and Ai are i-th order correction coefficients of the aspheric surfaces.

Exemplary embodiments of the wide-angle lens system 300 will be described below with reference to FIGS. 2-7. It is to be understood that the disclosure is not limited to these embodiments. The following symbols are used.

$F_{No}$: F number;

2ω: field angle;

R: radius of curvature;

D: distance between surfaces on the optical axis of the wide-angle lens system 300;

Nd: refractive index of lens; and

V: Abbe constant.

Tables 1 and 2 show specifications of a first exemplary embodiment of the wide-angle lens system 300, wherein f3=4.1 mm; f4=1.79 mm; f4/f3=0.44X; f1=−10.619 mm; f2=24.413 mm; |f1/f2|=0.435; D1=13.705 mm; D2=4.215 mm; D1/D2=3.251; v1/v2=2.358; N1/N2=1.061; $F_{No}$=2.8, wherein f3 is the focal length of the main lens 200, f4 is the total focal length of the wide-angle lens system 300, f4/f3 is the magnification of the transfer lens 100.

TABLE 1

| Surface | Surface requirements | R (mm) | T (mm) | Nd | Vd | k |
|---|---|---|---|---|---|---|
| 11 | Plane | Infinite | 1.23 | 1.73 | 54.7 | — |
| 12 | Standard | 7.743 | 11.41 | — | — | — |
| 21 | Asphere | −119.98 | 3.37 | 1.63 | 23.2 | 0 |
| 22 | Asphere | −13.834 | 4.48 | — | — | 0 |
| 220 | Plane | infinite | 4.1 | — | — | — |
| 231 | Plane | infinite | — | — | — | — |

TABLE 2

| Surface | A4 | A6 | A8 | A10 | A12 | A14 | A16 |
|---|---|---|---|---|---|---|---|
| 21 | 3.064794e−04 | −1.3618e−04 | 1.442137e−05 | −1.278906e−06 | 1.682924e−07 | −1.665871e−08 | 6.353736e−10 |
| 22 | 6.514819e−04 | −4.99514e−04 | 1.423217e−04 | −2.536744e−05 | 2.863517e−06 | −1.927666e−07 | 6.0436e−09 |

Figure 2:
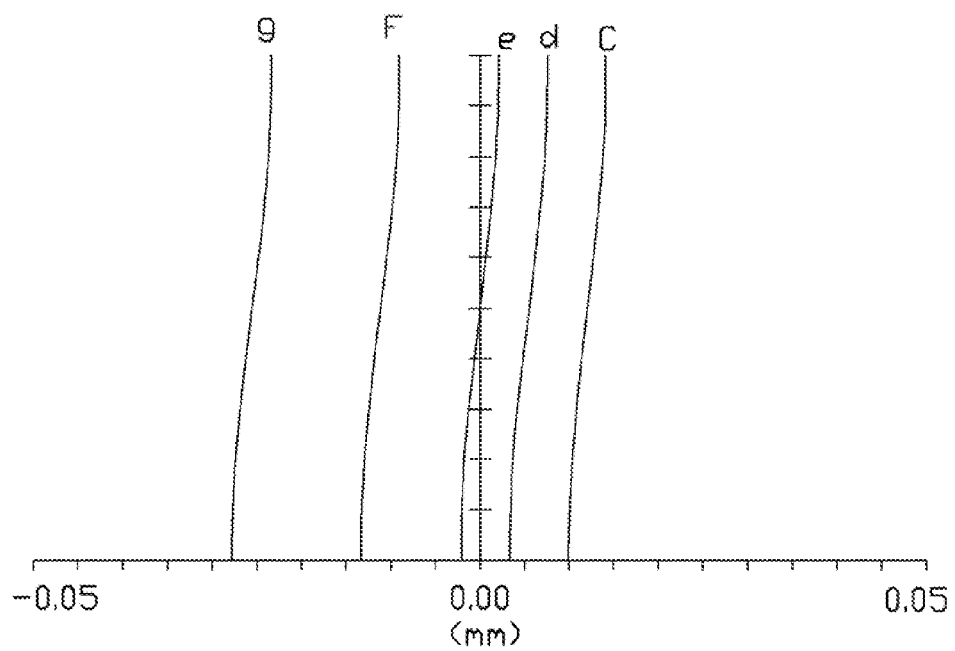
FIG. 2 is a spherical aberration diagram of the wide-angle lens system of a first exemplary embodiment.
Figure 3:
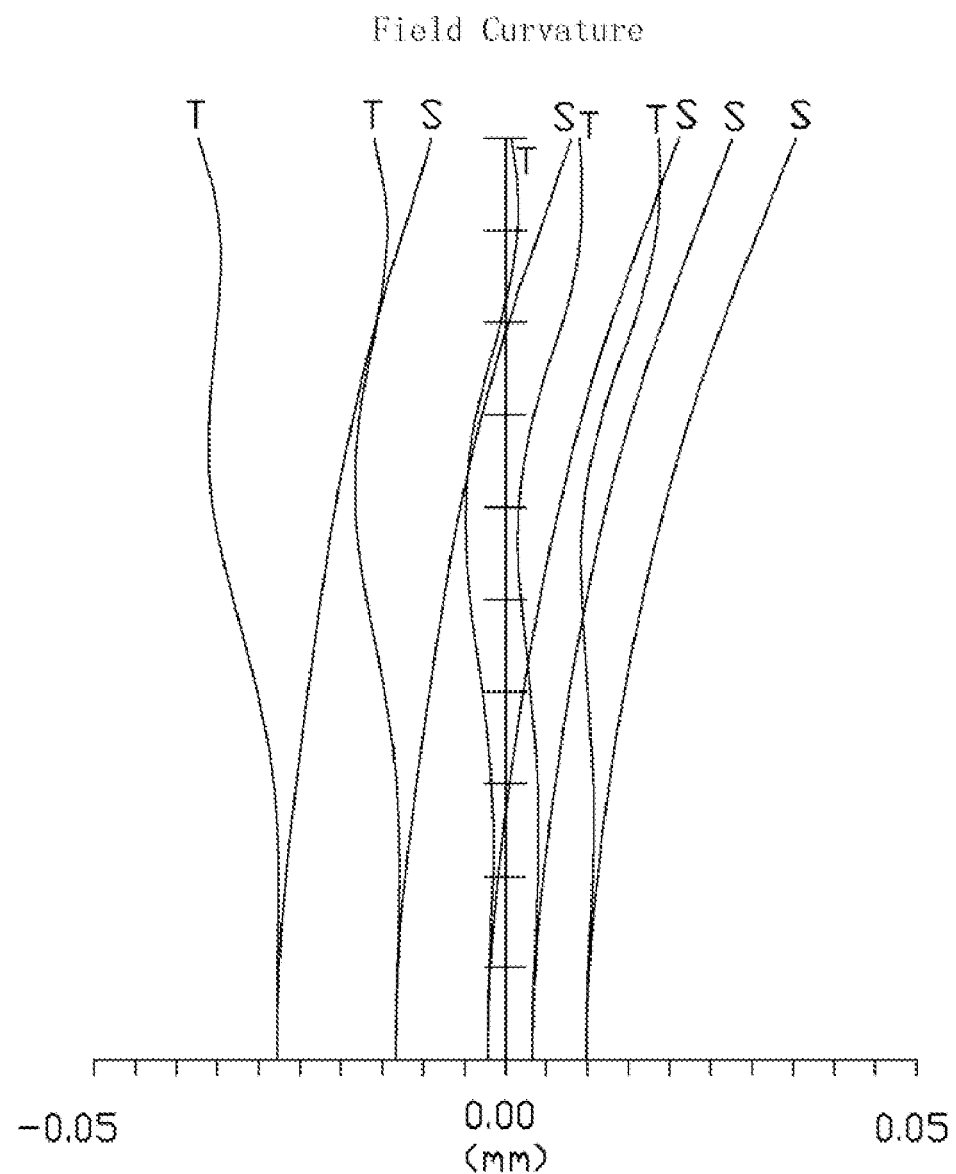
FIG. 3 is a field curvature diagram of the wide-angle lens system of the first exemplary embodiment.
Figure 4:
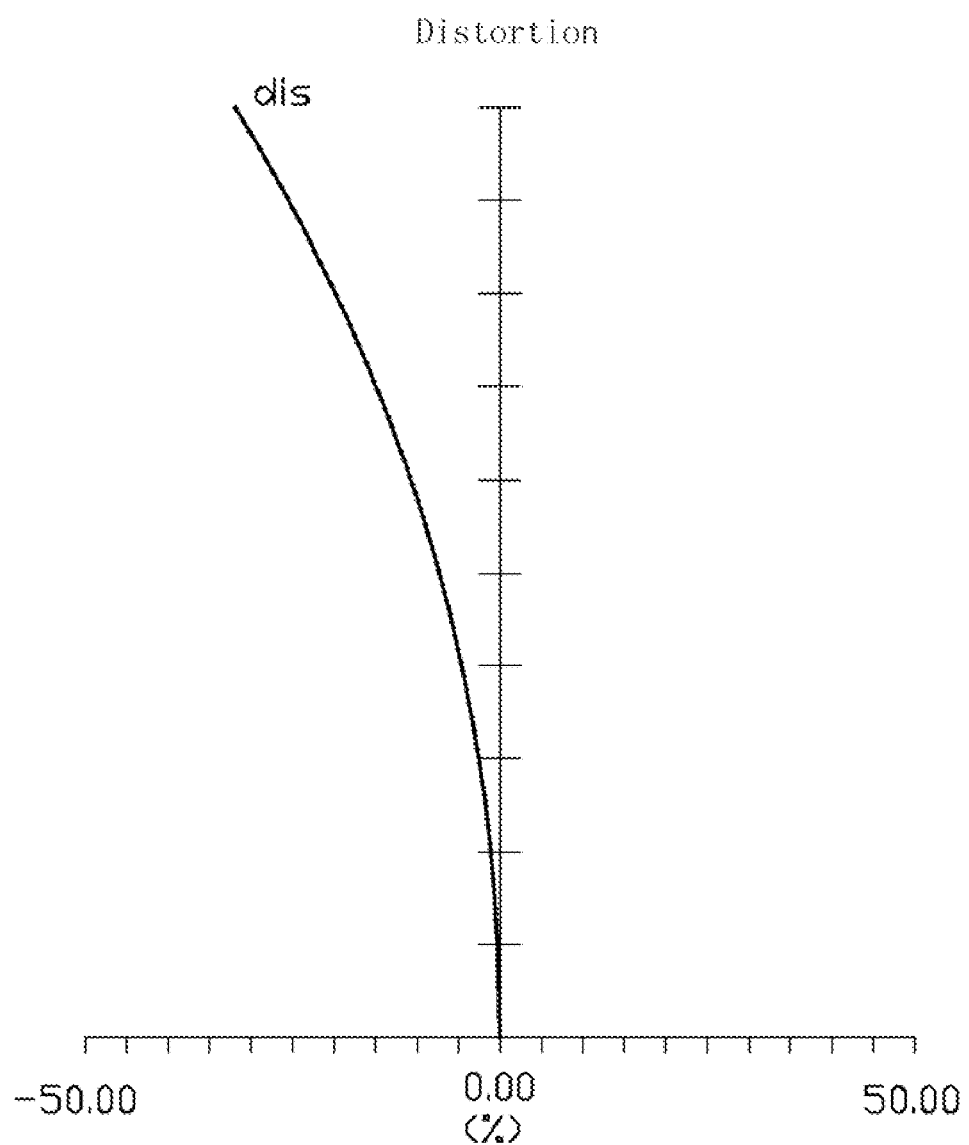
FIG. 4 is a distortion diagram of the wide-angle lens system of the first exemplary embodiment.

FIGS. 2-4 are graphs of aberrations (spherical aberration, field curvature, and distortion) of the first exemplary embodiment of the wide-angle lens system 300. As illustrated in FIG. 2, curves g, F, e, d, and C are respectively spherical aberration characteristic curves of g light (wavelength: 436 nm), F light (wavelength: 486 nm), e light (546 nm), d light (588 nm), and C light (656 nm). The spherical aberration of the first exemplary embodiment is from −0.05 mm to 0.05 mm. In FIG. 3, the curves T and S are the tangential field curvature curve and the sagittal field curvature curve respectively. The field curvature of the first exemplary embodiment is from −0.05 mm to 0.05 mm. In FIG. 4, the distortion of the first exemplary embodiment is from −40% to 40%.

In the first exemplary embodiment, though the overall length of the wide-angle lens system 300 is reduced, aberrations of the wide-angle lens system 300 are maintained within an acceptable range. The wide-angle lens system 300 keeps chromatic aberrations at a minimum while reducing the overall length of the wide-angle lens system 300.

Tables 3 and 4 show specifications of a second embodiment of the wide-angle lens system 300, wherein f3=4.1 mm; f4=3 mm; f4/f3=0.73X; f1=−40.885 mm; f2=55.693 mm; |f1/f2|=0.734; D1=14.73 mm; D2=4.37 mm; D1/D2=3.367; v1/v2=3.517; N1/N2=0.92; $F_{No}$=2.8, wherein f3 is the focal length of the main lens 200, f4 is the total focal length of the wide-angle lens system 300, f4/f3 is the magnification of the transfer lens 100.

TABLE 3

| Surface | R (mm) | T (mm) | Nd | Vd | k |
|---|---|---|---|---|---|
| 11 | infinite | 1 | 1.5 | 81.6 | — |
| 12 | 20.32 | 14.54 | — | — | — |
| 21 | 51.09 | 1 | 1.63 | 23.2 | 0 |
| 22 | −112.71 | 3.95 | — | — | 0 |
| 220 | infinite | 4.1 | — | — | — |
| 231 | infinite | — | — | — | — |

TABLE 4

| Surface | A4 | A6 | A8 | A10 | A12 | A14 | A16 |
|---|---|---|---|---|---|---|---|
| 21 | −4.917936e−04 | −1.427169e−04 | 2.153262e−05 | −1.051453e−06 | −1.439302e−07 | 1.754879e−08 | −3.271809e−10 |
| 22 | −3.762767e−04 | −3.651042e−04 | 1.188606e−04 | −2.381398e−05 | 2.825707e−06 | −1.861882e−07 | 5.717888e−09 |

Figure 5:
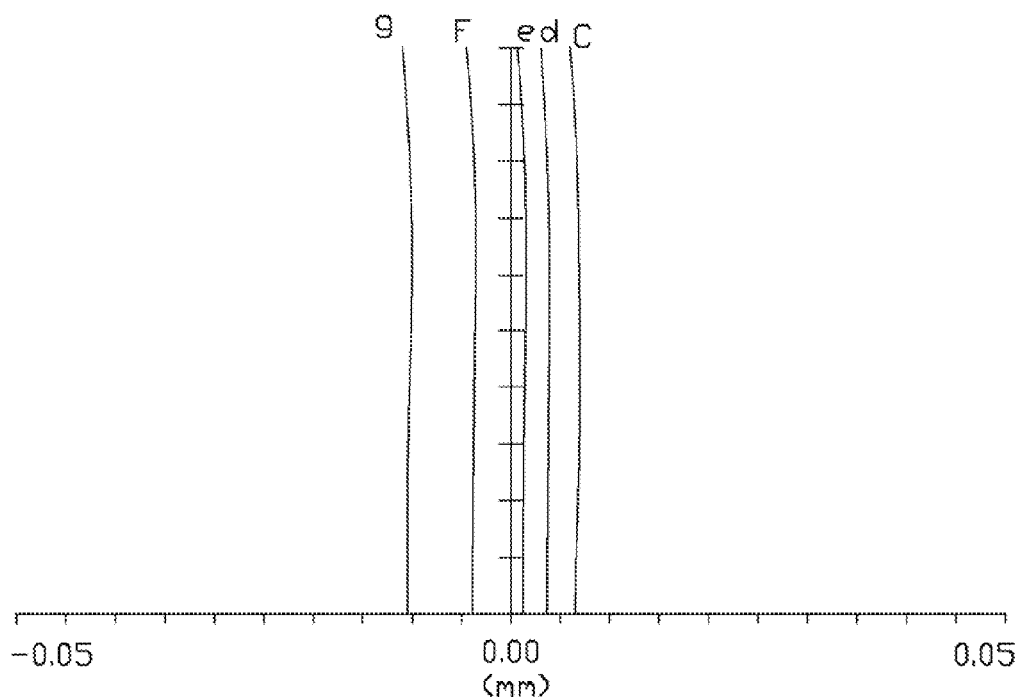
FIG. 5 is a spherical aberration diagram of the wide-angle lens system of a second exemplary embodiment.
Figure 6:
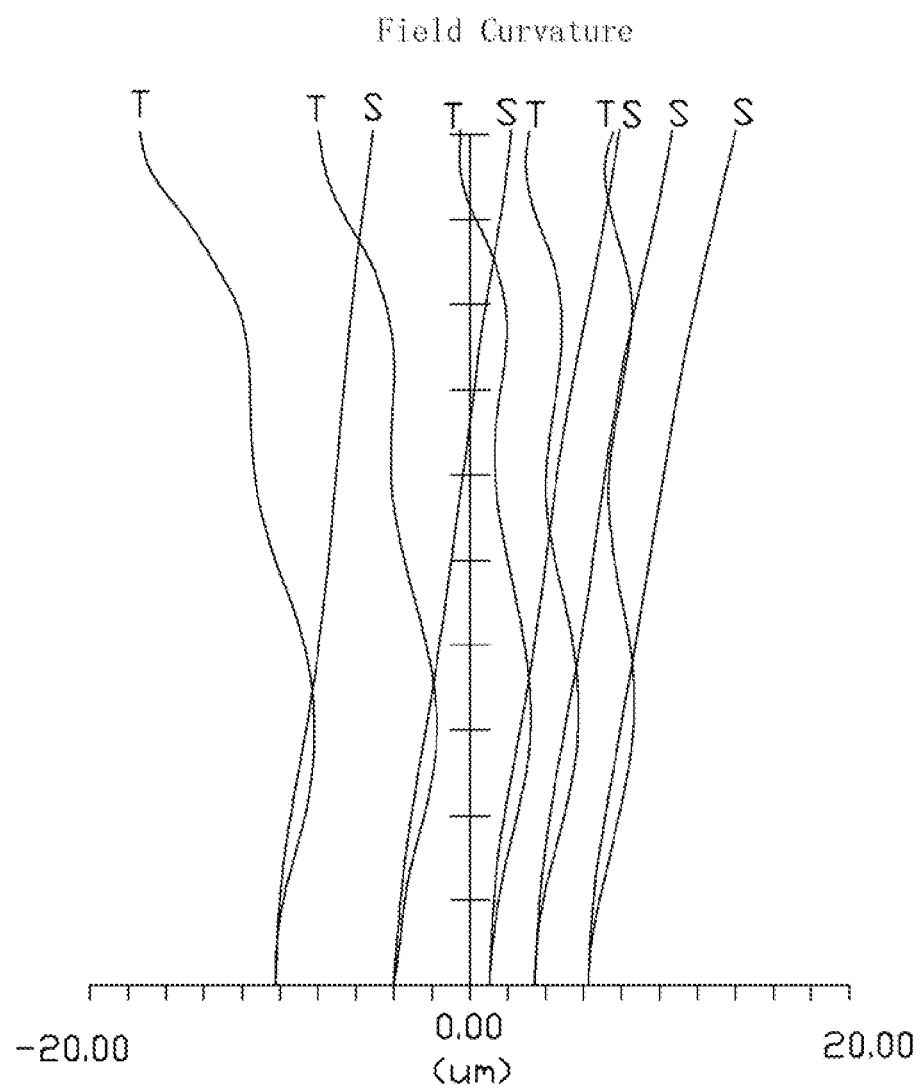
FIG. 6 is a field curvature diagram of the wide-angle lens system of the second exemplary embodiment.
Figure 7:
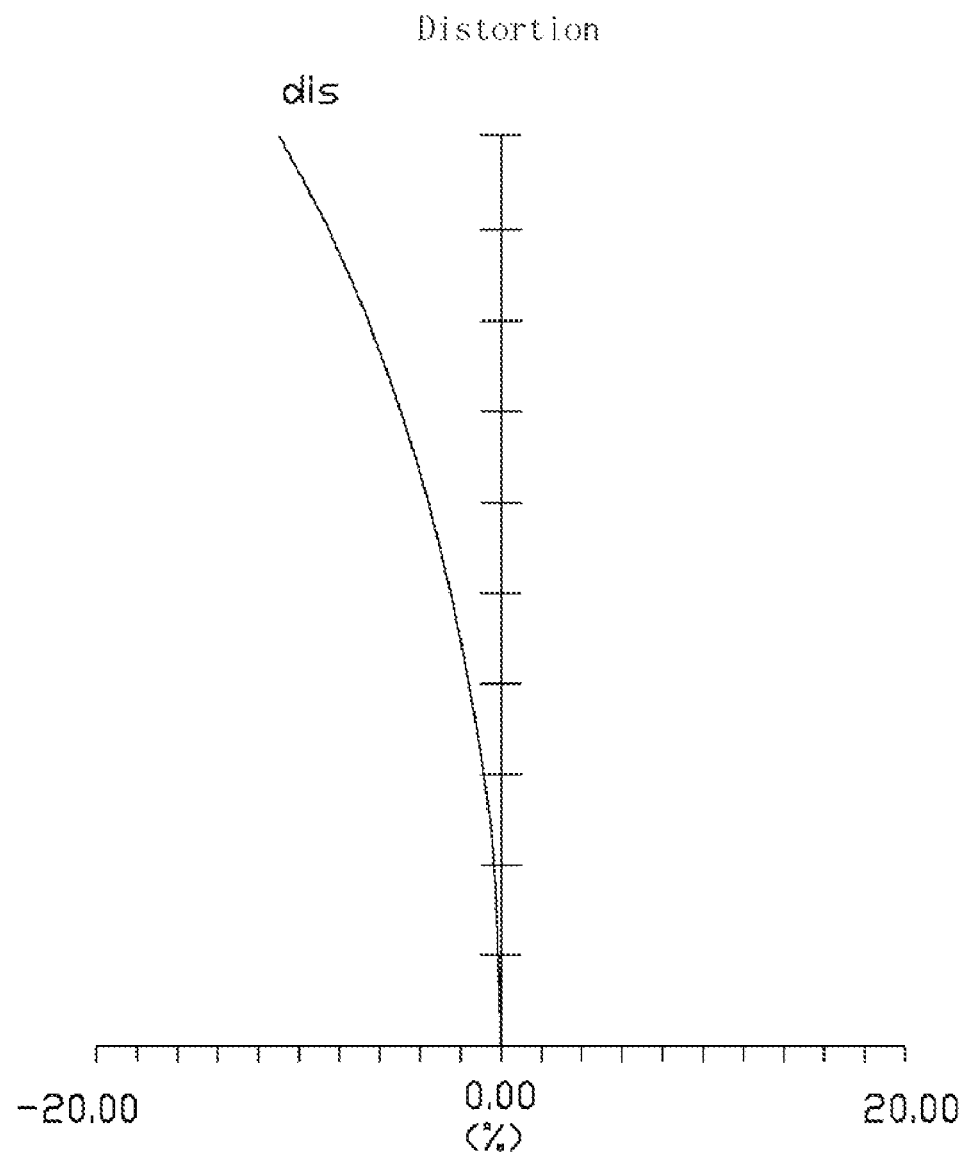
FIG. 7 is a distortion diagram of the wide-angle lens system of the second exemplary embodiment.

FIGS. 5-7 are graphs of aberrations (spherical aberration, field curvature, and distortion) of the second exemplary embodiment. As illustrated in FIG. 5, curves g, F, e, d, and C are respectively spherical aberration characteristic curves of g light (wavelength: 436 nm), F light (wavelength: 486 nm), e light (546 nm), d light (588 nm), and C light (656 nm). The spherical aberration of the second exemplary embodiment is from −0.05 mm to 0.05 mm. In FIG. 6, the curves T and S are correspondingly the tangential field curvature curve and the sagittal field curvature curve. The field curvature of the second exemplary embodiment is from −20 μm to 20 μm. In FIG. 7, the distortion of the second exemplary embodiment is from −20% to 20%.

In the second exemplary example, although the overall length of the wide-angle lens system 300 is reduced, aberrations of the wide-angle lens system 300 are maintained within an acceptable range. The wide-angle lens system 300 can widen the field angle of the wide-angle lens 100 while reducing the overall length of the wide-angle lens system 300.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A transfer lens, in order from the object side to the image side thereof, comprising:
a first lens having negative refraction power; and
a second lens having positive refraction power,
wherein the transfer lens satisfies the following conditions:

$0.4 < |f1/f2| < 0.8;$ $2 < v1/v2 < 3.8;$ $0.86 < N1/N2 < 1.12;$ where, f1 is a focal length of the first lens, f2 is a focal length of the second lens, v1 is an Abbe constant of the first lens, v2 is an Abbe constant of the second lens, N1 is a refractive index of the first lens, N2 is a refractive index of the second lens; wherein the transfer lens is aligned with a main lens comprising an entrance pupil plane to let in lights, the first lens comprises a first front principal point surface and a first rear principal point surface opposite to the first front principal point surface, the second lens comprises a second front principal point surface and a second rear principal point surface opposite to the second front principal point surface, and the transfer lens further satisfies the following condition: $3.1 < D1/D2 < 3.5$; wherein, D1 is a distance between a first front principal point surface of the first lens and the second front principal point surface of the second lens, D2 is a distance between the second rear front principal point surface of the second lens and the entrance pupil plane.

2. The transfer lens of claim 1, wherein the second lens comprises a second object-side surface and a second image-side surface opposite to the second object-side surface, the second image-side surface and the second object-side surface are aspheric surfaces.

3. The transfer lens of claim 1, wherein the second lens is made of plastic.

4. A transfer lens, in order from the object side to the image side thereof, comprising:
a first lens having negative refraction power; and
a second lens having positive refraction power,
wherein the transfer lens satisfies the following conditions:

$0.4 < |f1/f2| < 0.8;$ $2 < v1/v2 < 3.8;$ $0.86 < N1/N2 < 1.12;$ where, f1 is a focal length of the first lens, f2 is a focal length of the second lens, v1 is an Abbe constant of the first lens, v2 is an Abbe constant of the second lens, N1 is a refractive index of the first lens, N2 is a refractive index of the second lens; wherein the first lens comprises a first object-side surface facing the object side and a first image-side surface facing the image side, the first object-side surface is shaped as a plane, the first image-side surface is shaped as a concave surface.

5. A lens system comprising:
a main lens; and
a transfer lens aligned with the main lens, the optical axis of the main lens being superposed on that of the transfer lens, the transfer lens, in order from the object side to the image side thereof, comprising:
a first lens having negative refraction power; and
a second lens having positive refraction power;
wherein the lens system satisfies the following conditions:

$0.4 < |f1/f2| < 0.8;$ $2 < v1/v2 < 3.8;$ $0.86 < N1/N2 < 1.12;$ where, f1 is a focal length of the first lens, f2 is a focal length of the second lens, v1 is an Abbe constant of the first lens, v2 is an Abbe constant of the second lens N1 is a refractive index of the first lens, N2 is a refractive index of the second lens; wherein the transfer lens comprising an entrance pupil plane to let in lights, the first lens comprises a first front principal point surface and a first rear principal point surface opposite to the first front principal point surface, the second lens comprises a second front principal point surface and a second rear principal point surface opposite to the second front principal point surface, and the transfer lens further satisfies the following condition: $3.1 < D1/D2 < 3.5$; wherein, D1 is a distance between a first front principal point surface of the first lens and the second front principal point surface of the second lens, D2 is a distance between the second rear front principal point surface of the second lens and the entrance pupil plane.

6. The lens system of claim 5, wherein the first lens comprises a first object-side surface facing the object side and a first image-side surface facing the image side, the first object-side surface is shaped as a plane, the first image-side surface is shaped as a concave surface.

7. The lens system of claim 5, wherein the second lens comprises a second object-side surface and a second image-side surface opposite to the second object-side surface, the second image-side surface and the second object-side surface are aspheric surfaces.

* * * * *